United States Patent
Wu et al.

(10) Patent No.: US 7,218,846 B2
(45) Date of Patent: *May 15, 2007

(54) FAN SPEED CONTROL CIRCUIT

(75) Inventors: Chia-feng Wu, Changhua County (TW); Ching-sen Hsieh, Taoyuan County (TW); Yueh-lung Huang, Miaoli (TW); Ming-shi Tsai, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 202 days.

This patent is subject to a terminal disclaimer.

(21) Appl. No.: 10/839,818

(22) Filed: May 6, 2004

(65) Prior Publication Data
US 2005/0002657 A1 Jan. 6, 2005

(30) Foreign Application Priority Data
Jul. 4, 2003 (TW) ............... 92118358 A

(51) Int. Cl.
*H02P 7/29* (2006.01)
(52) U.S. Cl. ............... 388/831; 388/805; 318/599; 318/439; 318/254
(58) Field of Classification Search ........... 318/599, 318/77, 799, 801; 388/804; 363/41
See application file for complete search history.

(56) References Cited

U.S. PATENT DOCUMENTS

| | | | | |
|---|---|---|---|---|
| 4,802,077 A * | 1/1989 | Fujii et al. ............... 363/41 |
| 4,897,778 A * | 1/1990 | Miyamoto et al. ........ 700/69 |
| 5,099,408 A * | 3/1992 | Chen et al. ............... 363/41 |
| 5,627,441 A * | 5/1997 | Sakurai et al. ............ 318/599 |
| 5,952,798 A * | 9/1999 | Jones et al. ............... 318/268 |
| 5,977,741 A * | 11/1999 | DeLange et al. .......... 318/801 |
| 6,008,603 A * | 12/1999 | Jones et al. ............... 318/254 |
| 6,088,246 A * | 7/2000 | Okuyama et al. ........ 363/41 |
| 6,222,690 B1 * | 4/2001 | Tanaka et al. ............. 360/32 |
| 6,381,406 B1 * | 4/2002 | Smith et al. .............. 318/799 |
| 6,563,284 B2 * | 5/2003 | Teutsch et al. ........... 318/599 |
| 6,661,192 B2 * | 12/2003 | Copeland .................. 318/439 |
| 6,690,135 B2 * | 2/2004 | Mir et al. ................. 318/599 |
| 6,700,339 B2 * | 3/2004 | Vyssotski et al. ........ 318/254 |
| 6,703,803 B2 * | 3/2004 | Ohiwa et al. ............. 318/138 |
| 6,704,212 B2 * | 3/2004 | Furukawa et al. ........ 363/41 |
| 6,775,158 B2 * | 8/2004 | Fu ............................ 363/41 |
| 6,806,673 B2 * | 10/2004 | Ho ............................ 318/599 |
| 6,891,342 B2 * | 5/2005 | Nakamura et al. ....... 318/77 |
| 6,946,808 B2 * | 9/2005 | Kandori .................... 318/254 |
| 7,030,584 B1 * | 4/2006 | Alberkrack ............... 318/439 |
| 2002/0180518 A1 * | 12/2002 | Midya et al. ............. 330/10 |
| 2002/0195982 A1 * | 12/2002 | Copeland .................. 318/439 |
| 2003/0155886 A1 * | 8/2003 | Ohiwa et al. ............. 318/727 |

(Continued)

*Primary Examiner*—Paul Ip
(74) *Attorney, Agent, or Firm*—Pai Patent & Trademark Law Firm; Chao-Chang David Pai

(57) ABSTRACT

A fan speed control circuit includes a pulse width modulation (PWM) signal generating circuit, a driving circuit and a phase compensation unit. The PWM signal generating circuit generates a PWM control signal with a sequence of alternating on-time and off-time, and the driving circuit outputs a driving signal according to the PWM control signal to a fan motor. The phase compensation unit is connected to the fan motor for delaying or advancing the PWM control signal by a phase angle to synchronize the acting period of the back electromotive force formed by the magnetic flux variation with the off-time of the PWM control signal.

20 Claims, 5 Drawing Sheets

U.S. PATENT DOCUMENTS

| | | |
|---|---|---|
| 2003/0222608 A1* | 12/2003 | Vyssotski et al. ........... 318/254 |
| 2004/0027105 A1* | 2/2004 | Nakamura et al. .......... 323/267 |
| 2004/0056628 A1* | 3/2004 | Kandori ...................... 318/650 |
| 2004/0179830 A1* | 9/2004 | Sunaga et al. .............. 388/804 |
| 2004/0228232 A1* | 11/2004 | Takahashi et al. ....... 369/44.26 |
| 2005/0047761 A1* | 3/2005 | Babb et al. ................. 388/805 |
| 2006/0097677 A1* | 5/2006 | Brannen et al. ............ 318/439 |
| 2006/0097678 A1* | 5/2006 | Alberkrack et al. ........ 318/439 |

* cited by examiner

FAN SPEED CONTROL CIRCUIT

BACKGROUND OF THE INVENTION (a) Field of the Invention

The present invention relates to a fan speed control circuit and, more particularly, to a fan speed control circuit capable of reducing vibrations and noises in a fan motor by using a phase control method.

(b) Description of the Related Art

Among conventional fan speed control technologies, pulse width modulation (PWM) control is the most common method used to control the speed of direct current (DC) motors.

Referring to FIG. 1, in a conventional PWM control method, an external PWM signal 102 is used to drive a bipolar transistor 104 and a driver IC 106 such that the terminal voltage of a stator coil 108 is controlled. Also, a hall element 110 whose output voltage is directly proportional to the magnetic field strength is used to sense the magnetic polarity of the rotor in a fan motor.

Referring to FIG. 2, the fan motor is "on-time" as the pulse level of the incoming PWM signal 102 is high (also called the duty cycle), while the fan motor is "off-time" as the pulse level is low. The sum of these two times is one period. Therefore, one can, for instance, decrease the on-time or increase the off-time of the fan motor in one period to lower the motor speed.

In a brushless DC motor, cogging torque is produced by the magnetic attraction between the rotor mounted on permanent magnets and the stator, and it is an undesired effect that makes precise positioning of the rotor impossible because the rotor tends to lock onto the position where it is aligned with the stator poles. Further, when the rotor rotates, the magnetic flux variation causes back electromotive force (back emf) effect, and the back emf effect in turn enhances the cogging torque to result in high values of output ripple, vibrations, and noises in the fan motor.

BRIEF SUMMARY OF THE INVENTION

An object of the invention is to provide a phase control method of a PWM fan speed control circuit for effectively reducing vibrations and noises in a fan motor.

According to the design of the invention, a fan speed control circuit includes a PWM signal generating circuit, a driving circuit and a phase compensation unit. The PWM signal generating circuit generates a PWM control signal with a sequence of alternating on-time and off-time, and the driving circuit outputs a driving signal according to the PWM control signal to the fan motor. The phase compensation unit is connected to the fan motor for delaying or advancing the PWM control signal by a phase angle to synchronize the acting period of the back electromotive force formed by the magnetic flux variation with the off-time of the PWM control signal.

Through the design of the invention, since the PWM control signal can be delayed or advanced by a phase angle, the off-time of the PWM control signal can be set to synchronize with the acting period of the back electromotive force formed by the magnetic flux variation. Thus, the abrupt changes of the current waveform are cut off to smooth the rotation of the rotor, and vibrations and noises in the fan motor are considerably reduced as a result.

DETAILED DESCRIPTION OF THE INVENTION

Figure 1:
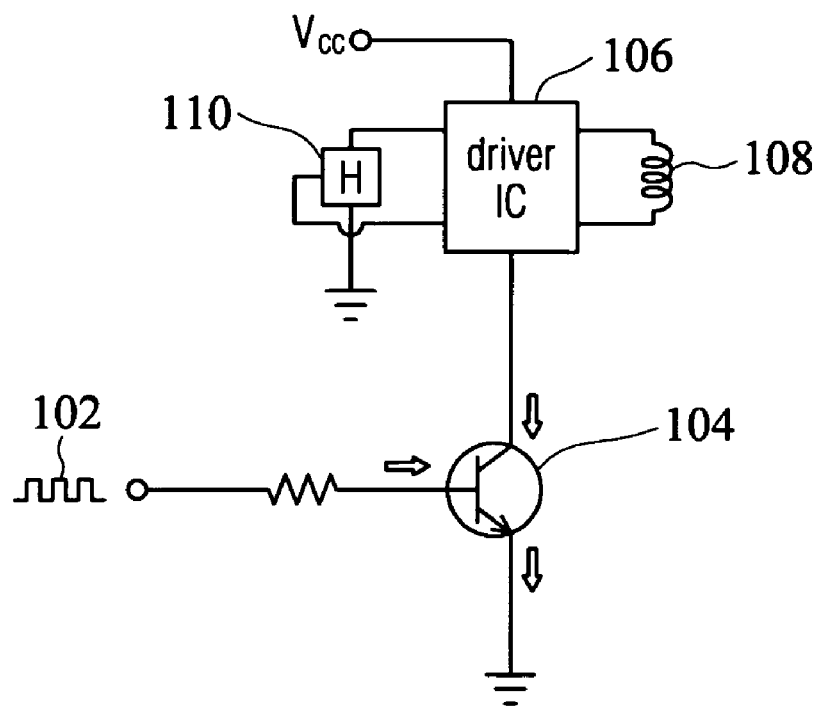
FIG. 1 is a schematic diagram illustrating a conventional PWM fan speed control circuit.
Figure 2:
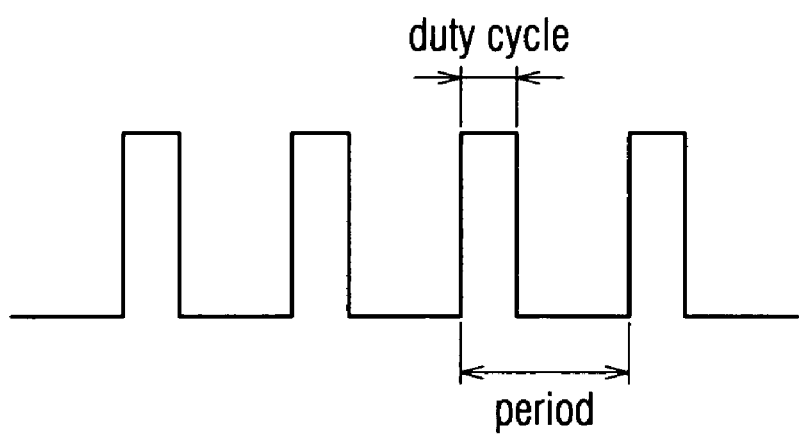
FIG. 2 is a schematic diagram illustrating a sequence of alternating on-time and off-time for a PWM control signal.
Figure 3A:
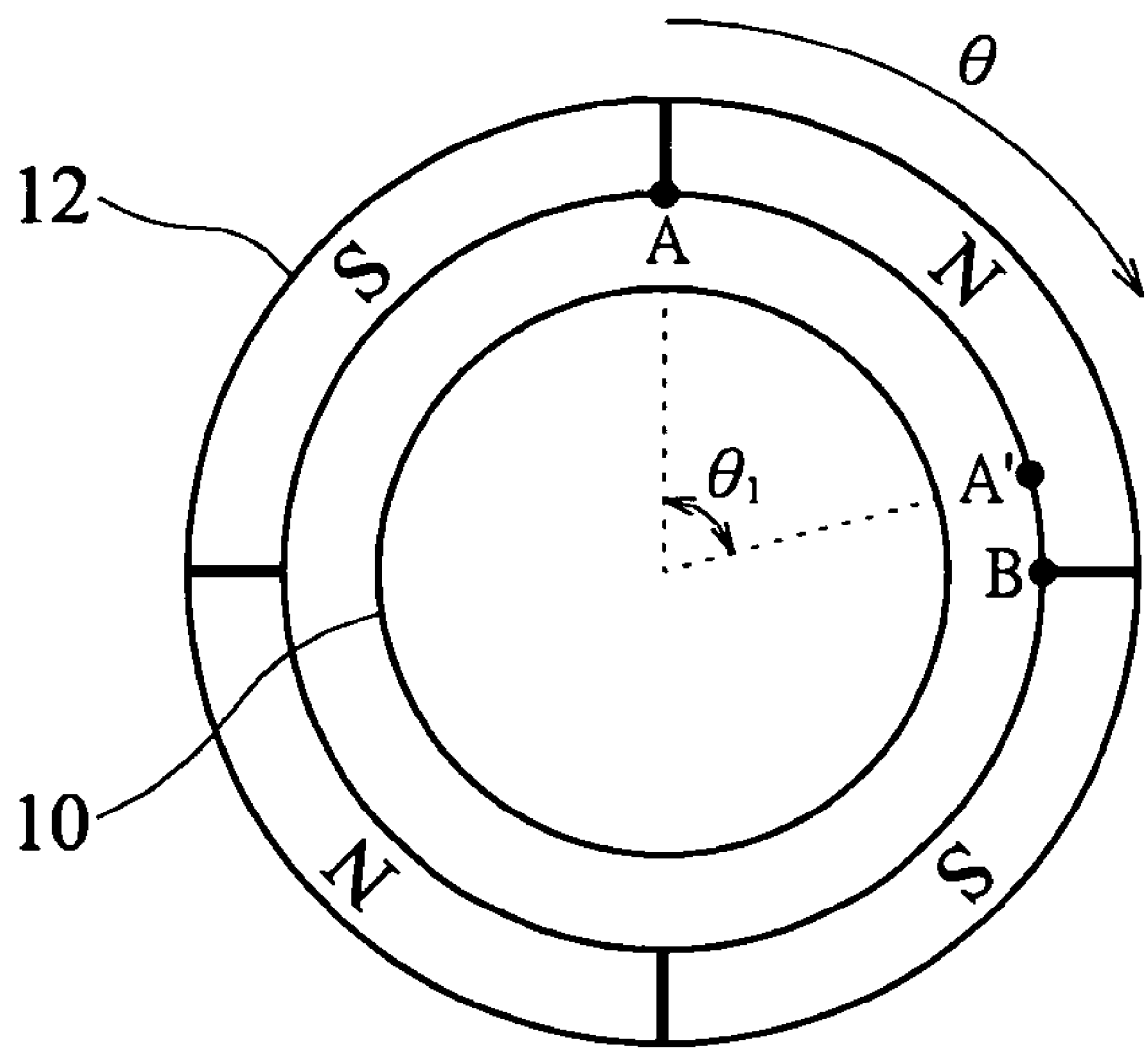
FIG. 3A is a schematic diagram illustrating the angular position of the rotor relative to the stator in a four-pole DC motor.
Figure 3B:
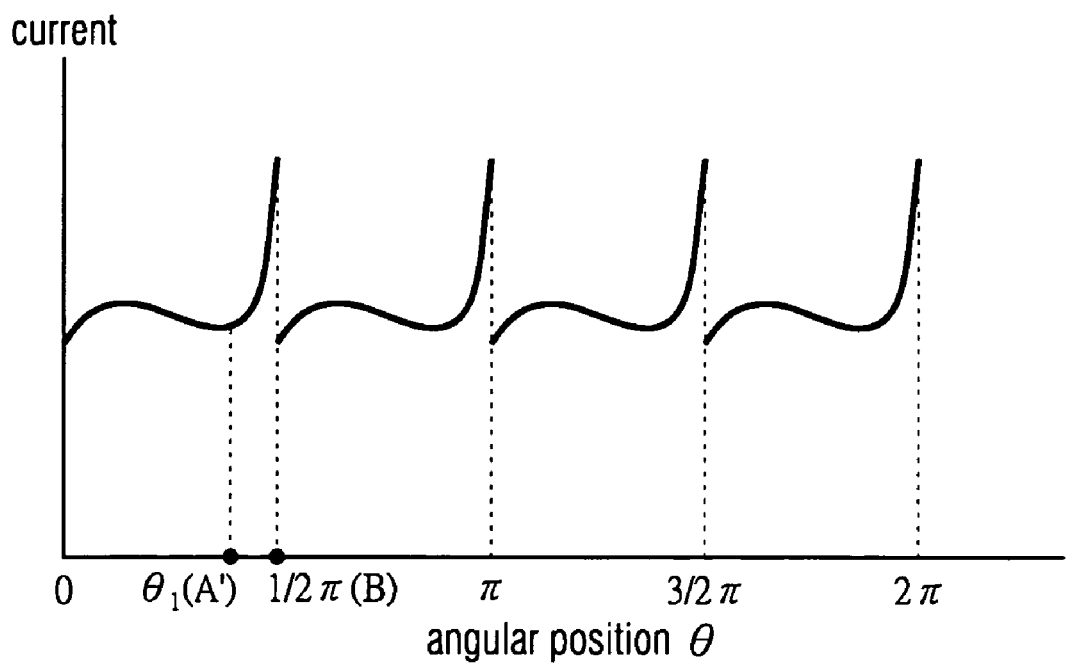
FIG. 3B is a schematic diagram illustrating the current waveform of the four-pole DC motor shown in FIG. 3A during unloaded operations.

FIG. 3A is a schematic diagram illustrating the angular position of the rotor 12 relative to the stator 10 in a four-pole DC motor; FIG. 3B illustrates the current waveform of the four-pole DC motor shown in FIG. 3A during unloaded operations, wherein the horizontal axis shows the clockwise-rotating angle (angular position $\theta$) of the rotor 12.

Comparing the relative angular position of the stator 10 and the rotor 12 in FIG. 3A with the current waveform in FIG. 3B, it can be seen that, for a four-pole motor, the current waveform abruptly changes due to the cogging torque when the rotor 12 rotates to angular positions near $n\pi/2$ (n=1, 2, 3 . . . ). For instance, after the rotor 12 starts to rotate clockwise from point A, the current waveform abruptly changes when the rotor 12 rotates to an angular position between $\theta_1$ (point A') and $\pi/2$ (point B), and the same is true with each of the other $\pi/2$ periods. On the other hand, since the rotor 12 is divided into four magnetic regions alternated between northern and southern polarities, when the rotor 12 rotates, the magnetic flux variation causes back electromotive force (back emf) effect, and the back emf effect in turn make the current waveform vary more dramatically at angular positions near $n\pi/2$ to result in high values of output ripple, vibrations, and noises in the fan motor.

Figure 3C:
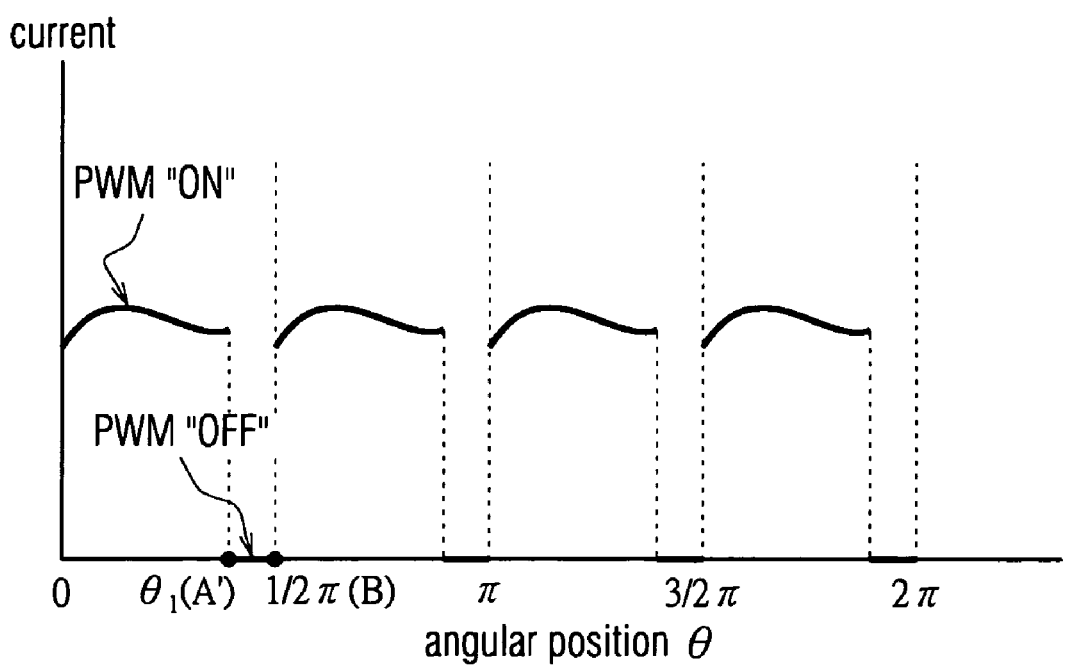
FIG. 3C is a schematic diagram illustrating the smooth current waveform of the four-pole DC motor achieved by the phase control method of the invention.

Therefore, this invention can be characterized in that the on-time and off-time of a pulse width modulation (PWM) control signal are determined in connection with the angular position of the rotor 12. Taking the four-pole motor of FIG. 3A as an example, when the PWM signal is on-time at point A, the rotor 12 starts to rotate due to the electromagnetic force. Then, the PWM signal is switched to off-time at point A' (angular position is $\theta_1$), for the current waveform starts to abruptly change at this time, and is then switched to on-time when the rotor 12 rotates to pass point B ($\theta=\pi/2$), and the same is true with each of the other $\pi/2$ periods. In such manner, the off-time of the PWM control signal is adjusted to synchronize with the acting period of the back emf to eliminate the abrupt changes of the current waveform, as illustrated in FIG. 3C.

Figure 4:
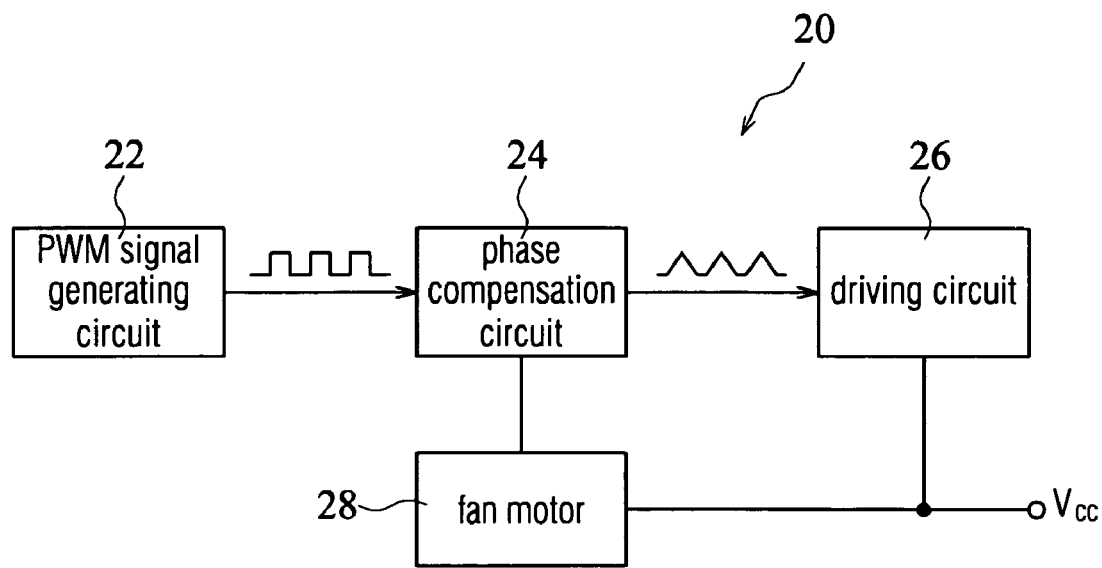
FIG. 4 is a circuit block diagram illustrating an embodiment of the fan speed control circuit of the invention.

FIG. 4 is a circuit block diagram illustrating an embodiment of the invention. Referring to FIG. 4, a fan speed control circuit 20 consists of a PWM signal generating circuit 22, a phase compensation circuit 24, and a driving circuit 26. The phase compensation circuit 24 is connected between the PWM signal generating circuit 22 and the driving circuit 26, and an input terminal of a fan motor 28 is independently connected to the phase compensation circuit 24.

The driving circuit 26 outputs a driving signal to the fan motor 28 according to the PWM control signal generated by the PWM signal generating circuit 22. Since the phase compensation circuit 24, coupled between the PWM signal generating circuit 22 and the driving circuit 26, can delay or advance the PWM control signal by a phase angle, the off-time of the PWM control signal can be set to synchronize with the acting period of the back emf formed by the magnetic flux variation. Thus, the abrupt changes of the current waveform are cut off to smooth the rotation of the rotor 12, and the vibrations and noises in the fan motor are considerably reduced as a result.

Figure 5:
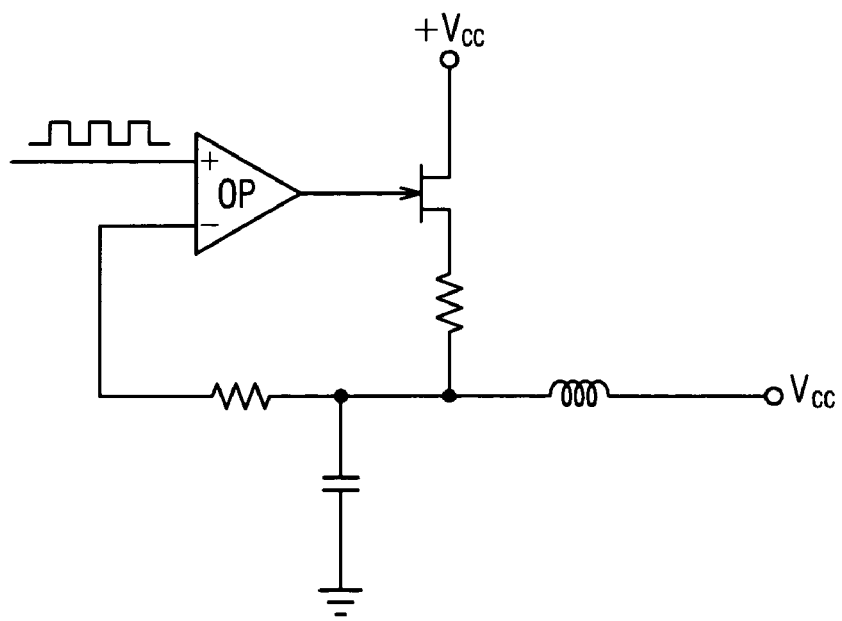
FIG. 5 is a circuit diagram of a phase delay circuit.
Figure 6:
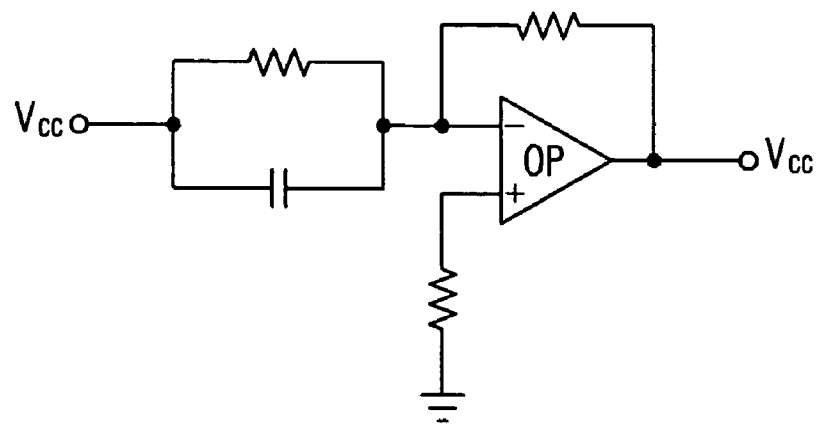
FIG. 6 is a circuit diagram of a phase advance circuit.

FIGS. 5 and 6 show examples of the phase compensation circuit 24 design according to the invention. The phase compensation circuit 24 that consists of operational amplifiers, transistors, resistors, and capacitors may be either a phase delay circuit as illustrated in FIG. 5, or a phase advance circuit as illustrated in FIG. 6. Through the phase compensation circuit 24, a PWM signal can be transformed into a triangular-wave signal, being delayed or advanced by a phase angle, to allow the sequence of alternating on-time and off-time to accurately correspond to the angular position of the rotor 12.

Figure 7:
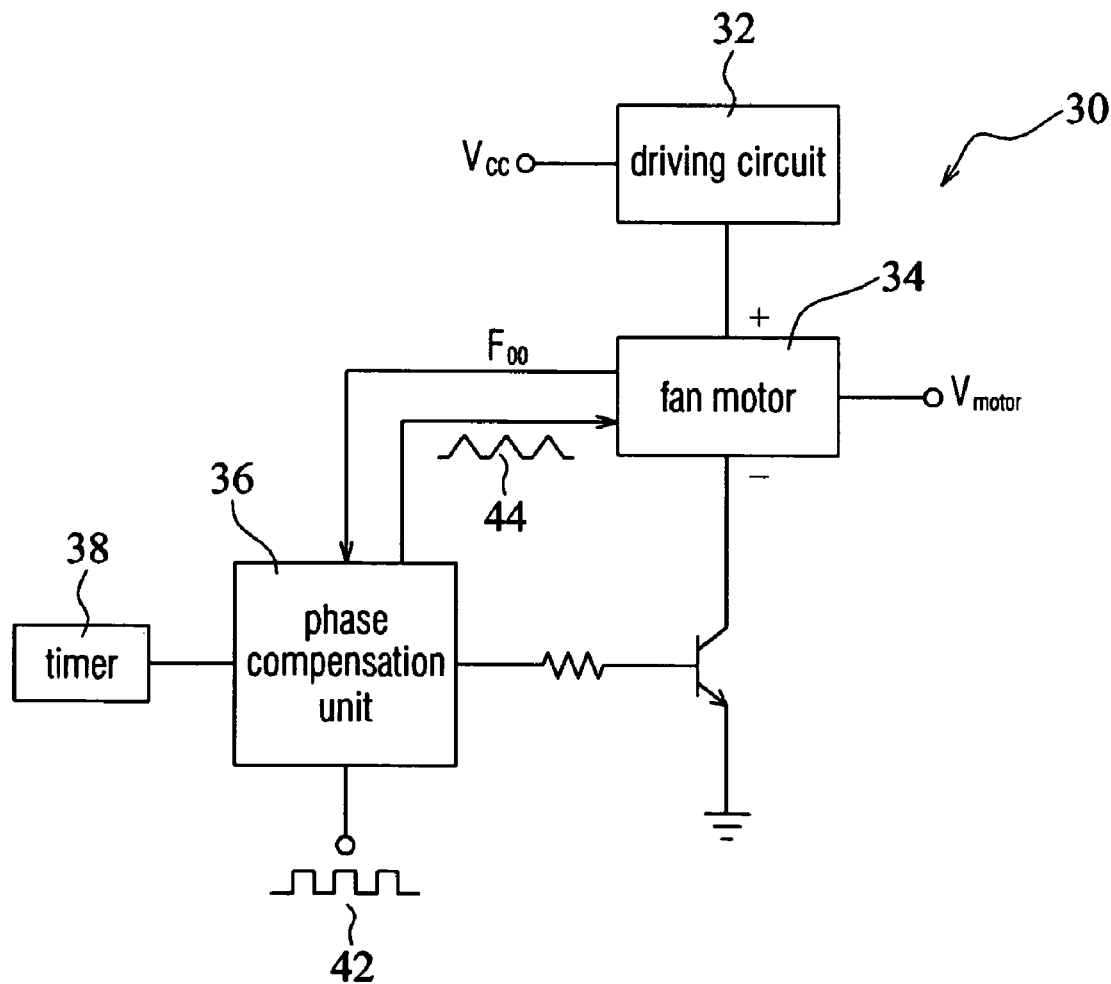
FIG. 7 is a circuit block diagram illustrating another embodiment of the fan speed control circuit of the invention.

FIG. 7 is a circuit block diagram illustrating another embodiment of the invention. The design concept of the invention is not limited to using the aforesaid phase compensation circuit 24 connected between the PWM signal generating circuit 22 and the driving circuit 26. Referring to FIG. 7, the fan motor 34 may independently output a signal indicating the current motor speed to a phase compensation unit 36 via a signal line $F_{oo}$, and the phase compensation unit 36 that includes a phase-locked loop, such as a phase delay circuit or a phase advance circuit, may delay or advance the PWM control signal 42 by a phase angle based on the speed signal from the signal line $F_{oo}$. Finally, a processed signal 44 is fed back to the fan motor 34 to adjust the sequence of alternating on-time and off-time of the PWM control signal. Further, a timer 38 may be added to precisely calculate the magnitude of the phase angle to be delayed or advanced.

Hence, the way of achieving phase compensating function is not limited as long as the off-time of the PWM control signal is set to synchronize with the acting period of the back emf formed by the magnetic flux variation. For example, the phase compensating function may be incorporated in a driver IC.

Further, with regard to the voltage control for the fan speed control circuit 20, it may be achieved either by a single voltage source $V_{cc}$ as illustrated in FIG. 4, or by separate voltage sources $V_{motor}$ and $V_{cc}$ as illustrated in FIG. 7.

The aforesaid four-pole motor is for illustrative purpose only, and the pole number of the fan motor according to the invention is including but not limited to four. For example, if a six-pole motor is used, the current waveform abruptly changes when the rotor 12 rotates to angular positions near $n\pi/3$ (n=1, 2, 3 ...), and one has only to vary the phase angle to be delayed or advanced to synchronize the off-time with the acting period of the back emf.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fan speed control circuit, comprising:
   a pulse width modulation (PWM) signal generating circuit for generating a PWM control signal with a sequence of alternating on-time and off-time;
   a driving circuit for outputting a driving signal according to the PWM control signal to a fan motor; and
   a phase compensation unit connected to the fan motor for delaying or advancing the PWM control signal by a phase angle to synchronize the acting period of the back electromotive force formed by the magnetic flux variation with the off-time of the PWM control signal.

2. The fan speed control circuit as recited in claim 1, wherein the phase compensation unit delays or advances the PWM control signal by a phase angle according to a speed signal fed from the fan motor.

3. The fan speed control circuit as recited in claim 2, wherein the phase compensation unit comprises a phase-locked loop.

4. The fan speed control circuit as recited in claim 3, wherein the phase-locked loop is a phase delay circuit.

5. The fan speed control circuit as recited in claim 4, wherein the phase delay circuit includes an operational amplifier, a transistor, resistors, an inductor and a capacitor, wherein the operational amplifier is respectively coupled to the PWM signal generating circuit, the transistor and one of the resistors.

6. The fan speed control circuit as recited in claim 3, wherein the phase-locked loop is a phase advance circuit.

7. The fan speed control circuit as recited in claim 6, wherein the phase advance circuit includes an operations amplifier, resistors, and a capacitor, wherein one of the resistors and the capacitor are coupled in parallel, and the operational amplifier and one of the resistors are coupled in parallel.

8. The fan speed control circuit as recited in claim 3, further comprising a timer for precisely calculating the magnitude of the phase angle to be delayed or advanced.

9. The fan speed control circuit as recited in claim 1, wherein the phase compensation unit is incorporated in a driver IC.

10. A fan speed control circuit, comprising:
    a PWM signal generating circuit for generating a PWM control signal with a sequence of alternating on-time and off-time;
    a driving circuit for outputting a driving signal according to the PWM control signal to a fan motor; and
    a phase compensation circuit connected between the PWM signal generating circuit and the driving circuit;
    wherein the phase compensation circuit is connected to a fan motor for delaying or advancing the PWM control signal by phase angle to synchronize the acting period of the back electromotive force formed by the magnetic flux variation with the off-time of the PWM control signal.

11. The fan speed control circuit as recited in claim 10, wherein the phase compensation circuit is a phase delay circuit or a phase advance circuit.

12. A fan speed control circuit, comprising:
    a fan motor; and
    a phase compensation unit for receiving a PWM control signal and delaying or advancing the PWM control signal by phase angle to synchronize the acting period of the back electromotive force formed by the magnetic flux variation with the off-time of the PWM control signal and outputting the processed PWM control signal to the motor.

13. The fan speed control circuit as recited in claim 12, wherein the phase compensation unit delays or advances the PWM control signal by a phase angle according to a speed signal fed from the fan motor.

14. The fan speed control circuit as recited in claim 13, wherein the phase compensation unit comprises a phase-locked loop.

15. The fan speed control circuit as recited in claim 14, wherein the phase-locked loop is a phase delay circuit.

16. The fan speed control circuit as recited in claim 15, wherein the phase delay circuit includes an operational amplifier, a transistor, resistors, an inductor and a capacitor, wherein the operational amplifier is respectively coupled to the PWM signal generating circuit, the translator and one of the resistors.

17. The fan speed control circuit as recited in claim 14, wherein the phase-locked loop is a phase advance circuit.

18. The fan speed control circuit as recited in claim 17, wherein the phase advance circuit includes an operations amplifier, resistors, and a capacitor, wherein one of the resistors and the capacitor are coupled in parallel, and the operational amplifier and one of the resistors are coupled in parallel.

19. The fan speed control circuit a recited in claim 14, further comprising a timer for precisely calculating the magnitude of the phase angle to be delayed or advanced.

20. The fan speed control circuit as recited in claim 12, wherein the phase compensation unit is incorporated in a driver IC.

\* \* \* \* \*